Aug. 2, 1960 W. L. PECKHAM 2,947,348
ARM REST AND CONCEALED TABLE UNIT
Filed Aug. 1, 1958 3 Sheets-Sheet 1
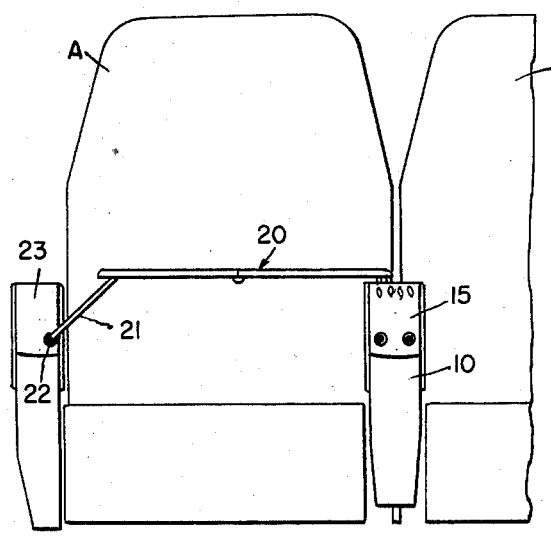
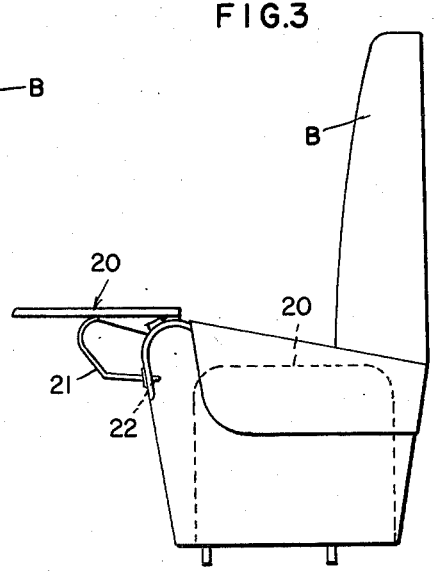
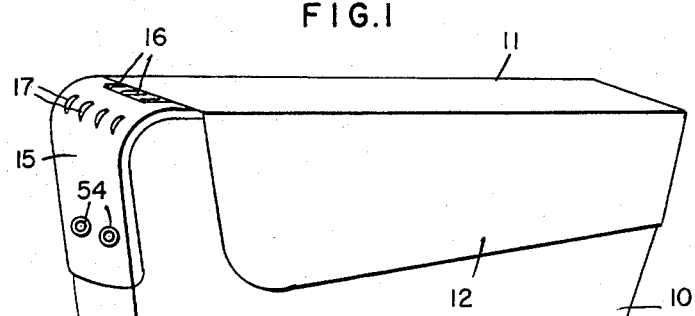
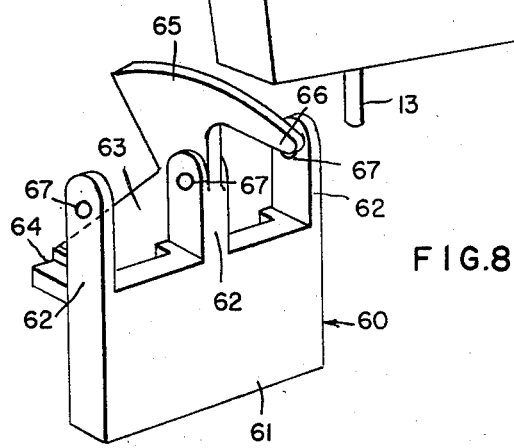
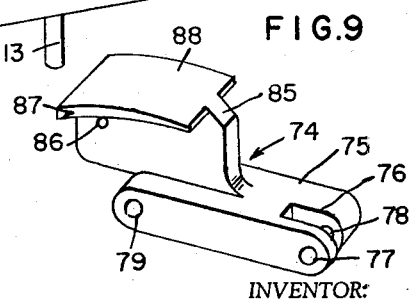
INVENTOR:
Wesley L. Peckham
BY
ATTY

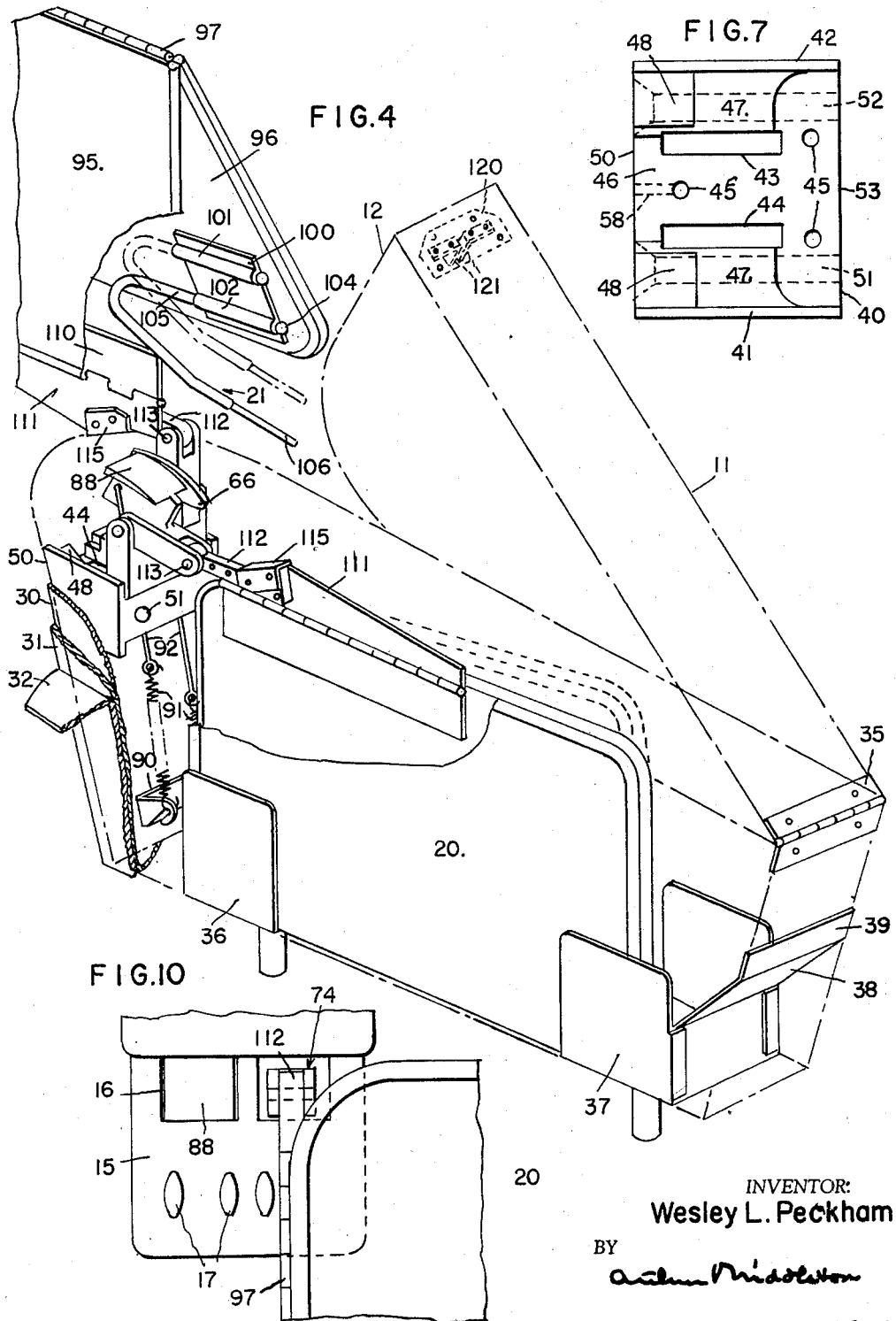

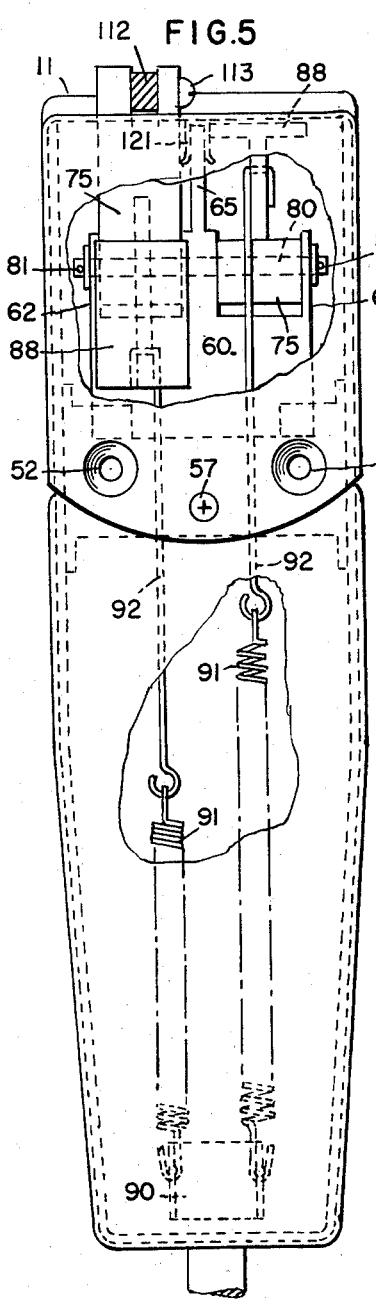
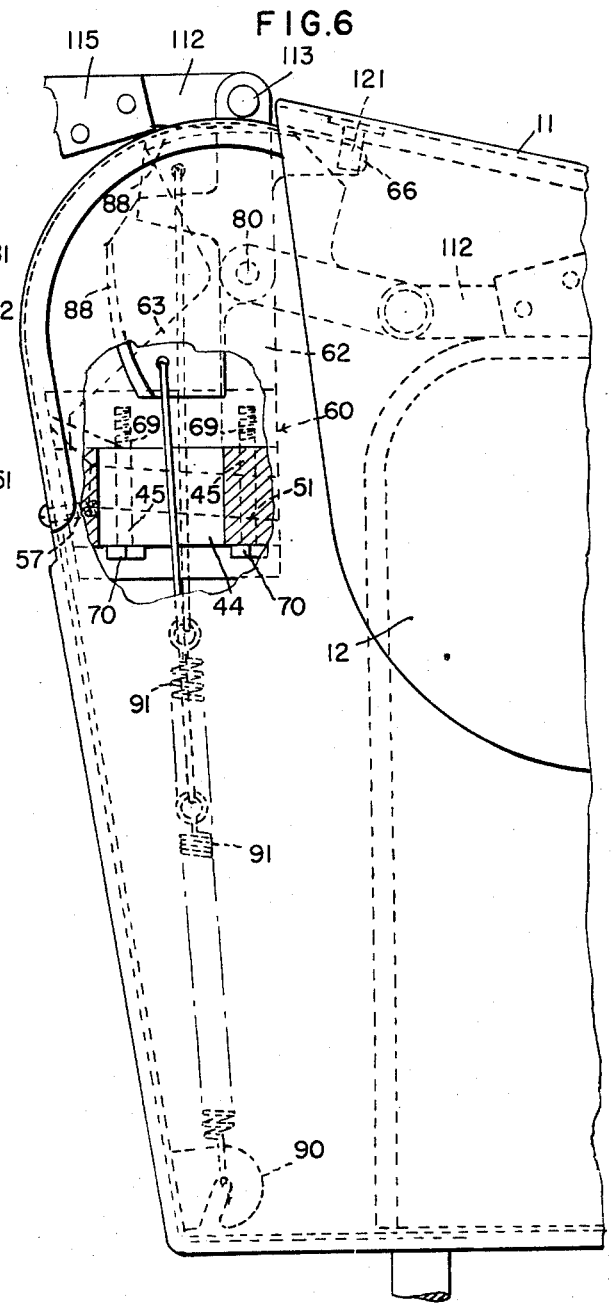

United States Patent Office 2,947,348
Patented Aug. 2, 1960

2,947,348

ARM REST AND CONCEALED TABLE UNIT

Wesley L. Peckham, Coral Gables, Fla., assignor to L. B. Smith Aircraft Corporation, Miami, Fla., a corporation of Ohio Filed Aug. 1, 1958, Ser. No. 752,460

8 Claims. (Cl. 155—128)

The present invention relates to an arm rest and concealed table unit, and more particularly to a removable unit which may be inserted in operative position between a pair of adjacent seats.

The present invention is particularly adapted for use in airplanes wherein it is desirable to have small tables extending laterally across the seats such that occupants may utilize the tables for supporting books or drinks, and for supporting food at meal time. Airplane seats are conventionally employed in pairs, and in many existing aircraft, removable arm rest units are provided between adjacent seats of a pair such that the arm rest may be removed thereby providing a greater unobstructed area such that a person may lie down on two adjacent seats if desired.

The construction according to the present invention provides a compact combined unit which is interchangeable with conventional arm rests now employed in aircraft, and accordingly an arm rest and table assembly according to the present invention may be easily substituted for arm rests now in use in many aircraft.

The provision of means for supporting food and the like has long presented a problem in aircraft, and it has been a common procedure in the past when serving meals to provide passengers with a small pillow which is placed in the lap, whereupon a tray supporting the food is placed on top of the pillow. This arrangement is, of course, rather awkward and certainly does not provide the desired degree of convenience. A later development has been the provision of portable trays which may be snapped into place by connecting suitable supporting mechanism to the seats. This type of trays or tables represents a marked improvement over the mere provision of pillows and trays supported thereon, but such portable tray mechanisms must be stored in some other location and then distributed to the passengers during flight. This, of course, requires much additional labor in order to assemble the trays in proper position, and after having served a meal, these trays are returned to their former location. It is accordingly evident that the tray and table mechanism presently in use in aircraft has not been too practical, and presents a number of disadvantages.

The arm rest and concealed table unit according to the present invention provides an extremely compact and simple arrangement wherein a pair of foldable table assemblies are pivotally mounted within a hollow body means which ordinarily serves as an arm rest between a pair of adjacent seats. The top of the arm rest unit is pivoted such that it may be moved upwardly, thereby permitting the table assemblies within the arm rest unit to be pivoted outwardly into operative position such that the two table assemblies extend in opposite directions in proper position over the adjacent pair of seats to provide a very neat and practical table for the occupants of each of the seats. The unit according to the present invention has a very pleasant appearance when the table assemblies are stored therewithin, such that the tables are completely concealed from view. One or both of the tables may be selectively pivoted into operative position, whereupon the top of the arm rest unit may again be moved downwardly such that when the tables are in erected position, the unit still provides an efficient arm rest whereby a person may utilize the table and arm rest simultaneously as when eating or reading and the like.

The table assemblies mounted within the unit comprise a foldable table including two hinge portions connected to one another, the table structure being supported upon a pivot structure secured to the body means. Means is provided for normally urging the tables upwardly and out of the units such that when the top of the unit is lifted, the table assemblies will pop up into position such that they may be easily grasped and moved to erected operative position. The unit is so constructed and arranged that when the tables are folded into operative position, they will be automatically disposed in and positively held in proper position such that they extend substantially horizontally and are disposed at a suitable distance above the level of the associated seat.

An important feature of the invention also lies in the fact that when the table assemblies are folded and disposed within the unit, they occupy a minimum of space whereby the entire arm rest and concealed table unit may be made of relatively narrow dimensions such that the unit, according to the present invention, is substantially the same size as conventional arm rest units now in use in aircraft. This is important since the conservation of space is a critical factor in aircraft. The apparatus, according to the present invention, is extremely simple to operate since it is merely necessary to pivot up the top of the unit and then grasp the foldable table structure and fold the table into operative position. When the tables are erected, they are quite sturdy and are maintained firmly in position such that they will adequately support various articles which may be placed thereon.

The top forward portion of the arm rest assembly is provided with a plurality of slots through which portions of the pivot structure project when the tables are in erected position. The pivot links which move the table assemblies upwardly and out of the body means of the unit project through these slots and have formed thereon an upper portion having an arcuate surface which is disposed closely adjacent the slots in the body means when the table assemblies are disposed within the unit. These arcuate flat surfaces are disposed closely adjacent the slots and substantially flush therewith such that they provide a closure means for the slots when the tables are in concealed position, thereby preventing the entrance of foreign matter into the interior of the unit.

While the invention apparatus is disclosed as comprising a pair of table assemblies mounted within each body means or arm rest, a single table assembly may also be mounted within each body means such that the unit is always to one side of a passenger such that operation thereof would not disturb a passenger in an adjacent seat. Of course, a seat recline mechanism may also be housed in the body means along with a single table assembly, if desired.

An object of the present invention is to provide a new and novel arm rest and concealed table unit which is interchangeable with conventional arm rest units now in use in aircraft.

Another object of the present invention is the provision of an arm rest and concealed table unit which has an attractive external appearance both when the tables are in concealed and erected positions, and which provides a very sturdy table assembly when in erected position.

Yet another object of the present invention is to provide such a unit wherein the table assemblies are automatically raised into position such that they may be grasped when the top of the unit is open, and wherein the table assemblies are automatically returned to concealed position when the top is again closed, if the tables are not folded into operative position.

A further object of the present invention is the provision of a new and novel arm rest and concealed table unit which is very simple to operate and which is automatically positioned in proper position relative to the seat when unfolded by a passenger.

A still further object of the present invention is to provide such a unit which is very compact and occupies a minimum amount of space, and which may be quickly and easily assembled or disassembled.

Still another object of the present invention is the provision of such a unit which is simple and inexpensive in construction, and yet which is rugged and reliable in operation.

Other objects and many attendant advantages of the invention will become more apparent when considered in connection with the accompanying specification and drawings wherein:

Fig. 1 is a perspective view of the unit according to the present invention;

Fig. 2 is a front view illustrating the unit in position between a pair of adjacent seats in an airplane or the like;

Fig. 3 is a side view illustrating the unit in position adjacent a seat;

Fig. 4 is a perspective view, partly in section and cut away to illustrate the internal details of the apparatus;

Fig. 5 is a front view of the unit partly broken away;

Fig. 6 is a side view of the apparatus shown in Fig. 5, partly broken away and in section;

Fig. 7 is a top view of the base member of the pivot structure;

Fig. 8 is a perspective view of the pivot bracket of the device;

Fig. 9 is a perspective view of one of the pivot links of the invention; and

Fig. 10 is a top view of a portion of the apparatus illustrating the top forward portion of the arm rest when one of the table assemblies is in erected position and the other is in concealed position.

Referring now to the drawings wherein like reference characters designate corresponding parts throughout the several views, there is shown in Fig. 1 the novel arm rest and concealed table unit according to the present invention including a narrow elongated body means indicated by reference numeral 10, the body means having a hollow interior for receiving a pair of table assemblies, and including a pivotal top closure member 11. Member 11 includes integral downwardly extending flanges 12 disposed on opposite sides of the unit, and a pair of downwardly projecting lugs 13 is secured to the lower surface of the unit for mounting the unit in operative position between a pair of seats. The lugs 13 are similar to the lugs presently employed in conventional arm rests whereby the unit, according to the present invention, may be substituted for arm rests now in use in aircraft.

A curved plate 15 is secured to the forward end of the unit and is molded to fit smoothly with the front surface of the body member and the top thereof is disposed flush with the top of the member 11 such that a neat appearing flat upper surface is provided upon which a passenger may rest his arm. A pair of slots 16 is provided in the upper portion of plate 15, and four spaced lugs 17 extend outwardly from the plate for a purpose hereinafter more fully described.

Fig. 2 illustrates the unit according to the present invention mounted in operative position between a pair of seats A and B, the table assembly indicated generally by reference numeral 20, being shown in erected position over seat A with a table support member 21 disposed at one end thereof and extending into a suitable opening 22 provided in the conventional fixed arm rest 23 adjacent the opposite side of the seat. The table assembly for seat B is not in erected position, but is completely concealed within unit 10.

Referring now to Fig. 4, elongated body means 10 comprises a relatively rigid outer frame 30 formed of a suitable material, such as aluminum or the like, the outer surface of the frame being conventionally covered with a layer of padding material 31 and upholstery 32 to provide an attractive and comfortable arm rest construction. Top closure member 11 is pivotally connected to the rear portion of the body means 10 by a hinge 35 such that top 11 may be pivoted upwardly into open position as shown in phantom lines in Fig. 4. Bracket members 36 and 37 are provided within body means 10 for stiffening the body means and for defining an area within which the foldable table structures are received. Bracket 37 has a rearwardly extending portion 38 terminating in an upwardly projecting portion 39 connected with the back wall of the body means, portions 38 and 39 providing clearance for the foldable table structures when they are pivoted in and out of the body means. Bracket members 36 and 37 also provide guide means to control the motion of the stowed tables in a vertical direction during the initial upward movement of the assemblies. This is an important feature since it allows the table assemblies to be stowed in a housing of less length than would be required if the motion of the table assemblies were entirely circular about their pivot axes.

A base member 40, seen most clearly in Fig. 7, is substantially rectangular in plan configuration and has side flanges 41 and 42 disposed at opposite sides thereof. A pair of slots 43 and 44 is formed through the base member, and three similar openings 45 are also provided through the base member. A first surface 46, being substantially T-shaped in configuration, is formed on the upper surface of the base member and a pair of surfaces 47 disposed outwardly of each of the slots is raised slightly above the level of surface 46. Flat surfaces 48 slope upwardly from surfaces 47, a portion of one of surfaces 48 being visible in Fig. 4, but portions 48 do not extend up quite to the top of side flanges 41 and 42. The forward surface 50 of base member 40 slopes downwardly and inwardly, and a pair of openings 51 and 52 extends from the forward surface 50 to the rearward surface 53 of the base member. Portions of forward surface 50 of the base member surrounding the forward ends of each of openings 51 and 52 are recessed, the surfaces 48 providing sufficient material in the body for surrounding the recessed portions of the openings at the forward ends thereof.

A pair of trim grommets 54 are disposed in suitable openings provided in plate 15 and aligned with openings 51 and 52 for receiving the support arms of standard "plug-in" type tables in the event of a breakdown of the invention mechanism. Grommets 54 prevent the support arms inserted therein from being scratched or damaged.

Plate 15 is secured to the base member by threaded bolt 57 which is threaded into a threaded opening 58 provided in the base member as seen most clearly in Fig. 7.

As shown most clearly in Fig. 8, a pivot bracket, indicated generally by reference numeral 60, includes a main body portion 61 having formed integral therewith three spaced upwardly extending ears 62 defining therebetween a pair of yokes. Formed integral with and extending centrally from the rear surface of main body portion 61 is a rearwardly extending wall 63 which tapers downwardly to a base portion 64. Formed integral with wall 63 is an upwardly and rearwardly extending projection 65, the outer elongated end 66 thereof serving as a latching means as more clearly pointed out hereinafter. Ears 62 each are provided with openings 67 formed therethrough. Three threaded openings are provided in the lower surface of pivot bracket 60, the three openings 69 being so positioned as to be aligned with openings 45 provided in base member 40 whereby when the pivot bracket is mounted upon the base member, three bolt members 70, two of which are seen in Fig. 6, extend upwardly through openings 45 and are threaded into the aligned openings in the pivot bracket member for securely fastening the pivot bracket to the base member. As seen most clearly in Fig. 9, a pair of pivot link members is provided, each of which is indicated generally by reference number 74 and consists of an elongated relatively wide body portion 75 having a slot 76 formed in one end thereof, openings 77 and 78 being aligned with one another and extending entirely through the body portion 75 on opposite sides of slot 76. Another opening 79 is provided through the forward end of main body portion 75 and is adapted to be aligned with openings 67 formed in ears 62 of the pivot bracket. As seen in Fig. 5, a shaft 80 extends through aligned openings 67 and 79 for supporting a pair of link members 74 in position on the pivot bracket, cotter pins 81 being provided through suitable openings in the outer ends of the shaft for maintaining the shaft in proper operative position.

Each of link members 74 has an integral upstanding narrow portion 85 extending from the upper surface of portion 75, portion 85 having an opening 86 formed therethrough. The upper portion of portion 85 is enlarged in a lateral direction having an arcuate flared cross-sectional configuration as seen at 87, and defining a rather broad arcuate upper surface 88, the purpose of which will be more fully described hereinafter.

As seen most clearly in Figs. 4, 5 and 6, a bracket 90 is secured to the lower portion of the forward wall of the body means, and a pair of tension spring members 91 is connected by means of connector members 92 to the pivot links 74, the upper ends of connectors 92 extending through openings 86 in the pivot links. It is apparent that the springs 91 normally urge the pivot links in a counterlockwise direction about the axis of shaft 80 as viewed in Fig. 6.

As seen most clearly in Fig. 4, the foldable table structure includes a first leaf portion 95 and a second leaf portion 96 hingedly secured to one another by a hinge 97. Leaf portion 96 has a plate 100 secured to the undersurface thereof, plate 100 having substantially semi-cylindrical integral channels 101 and 102 formed therein for receiving a table support member 21. Table support member 21 has an enlarged end portion 104 for preventing the support member from escaping from one of the channels defined by portions 101 and 102. Support member 21 includes a slidable shank portion 105 which may be slidably disposed in either of the channels formed in the plate, whereby the support member may be adjustably positioned for different size seats. Support member 21 is bent such that it extends backwardly toward the adjacent seat and includes a reduced terminal end portion 106 which is received within a suitable opening provided within the fixed arm rest adjacent one side of the seat for supporting one end of the table.

Leaf portion 95 of the table is connected to one member 110 of a hinge, the opposite member 111 of which is fixed to an arm 112 which extends within slot 76 provided in an associated pivot link 74 and is pivotally secured thereto by a pin 113 which extends through openings 77 and 78 of the pivot link and a suitable opening provided in arm 112.

One edge of each of hinges 111 is provided with a channel shaped bracket 115 formed of suitable material, such as hard rubber or the like, which is adapted to engage the upper surface of plate 15 between the lugs 17 thereon for positively positioning the arm 112 in proper position for preventing damage to the upper surface of the plate. Bracket 115 also adds considerably to the lateral stability of the table in the set-up position.

As seen in Fig. 4, the left hand foldable table assembly is shown in normal concealed position, and the right hand table assembly is shown in partially erected position with the top member 11 pivoted upwardly. In the concealed position as shown in the left hand assembly, the upper flat arcuate surface 88 of one of pivot links 74 is disposed adjacent the slots 16 formed in plate 15, whereby surface 88 is disposed closely adjacent the slot and provides a closure means therefor. It is accordingly evident that, when both the table assemblies are in concealed position within the unit, the slots will be closed in the upper surface of the plate 15, thereby preventing foreign material from entering the unit. When the table assemblies are pivoted into operative position, the body portion 75 of each of the pivot links is received within slots 16, thereby permitting the table structure to be pivoted into operative position.

The hinges connecting the pair of foldable table assemblies to the associated hinge members 111 are disposed in reverse relationship such that when the two table assemblies are pivoted outwardly into operative position and the tables folded into erected position as shown in Fig. 2, the two tables will extend in a lateral direction oppositely from one another such that the tables will overlie adjacent seats. It is apparent that the leaf portions 96 of each of the foldable table assemblies will be supported by a fixed arm rest disposed at an opposite side of the seat from the unit according to the present invention.

A bracket 120 is secured to the lower surface of top member 11 and has a pair of downwardly projecting spring clip members 121 which are spaced from one another a distance slightly less than the thickness of elongated portion 66 of the pivot bracket. When the top closure member 11 is pivoted into closed position, spring clips 121 will snap over portion 66 which is fixed in the body means, thereby providing a locking means for securing the top in closed position. The top may be easily pivoted into open position as shown merely by grasping the outside of the top member. It is also apparent that when the top member is in closed position, it will lie such that the top surface thereof is substantially flush with the adjacent surface of plate 15.

Fig. 10 shows the upper forward portion of plate 15 with the arcuate surface 88 of one of the pivot links serving to close the adjacent slot 16, and the other pivot link 74 extending up through the slot with the associated table assembly in operative position. It is apparent that, even when the apparatus is in erected position, only a very small portion of the slot remains open, thereby preventing any large pieces of foreign matter from entering into the unit.

Springs 91 are of sufficient strength such that, when the top is pivoted into open position, link 74 and the associated table assemblies will be rotated about the axis of shaft 81, thereby causing the foldable table structure to be moved upwardly and partially out of the unit whereby a passenger may easily grasp the unit and move it into fully erected position.

It is apparent from the foregoing that there is provided a new and novel arm rest and concealed table unit which is interchangeable with present arm rests now employed in aircraft and which provides a very attractive external appearance both when the table assemblies are disposed in concealed condition and when in fully erected position. The foldable table structures automatically pop up into position where they may be easily grasped and moved into operative position whenever the top of the body means of the unit is open, and in addition, if a passenger does not wish to erect the table structure when the top is open, subsequent downward movement of the top member will automatically force the unerected table structure back into concealed position. The apparatus is automatically positioned in its proper operative location when operated by a passenger, and provides a very sturdy table structure. The device is very simple to operate and occupies a minimum of space, thereby permitting the unit, according to the present invention, to be utilized with seats having the spacing now employed in conventional aircraft. The apparatus according to the present invention may be quickly and easily assembled and disassembled, and is simple and inexpensive in construction, yet is rugged and reliable in operation.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

I claim:

1. An arm rest and concealed table unit, comprising a hollow body means having means for securing the unit between a pair of adjacent seats, said body means having a movable portion providing access to the interior thereof, a foldable table pivotally mounted within said body means, said table including first and second portions hingedly connected to one another and adapted to be folded into substantially parallel relationship with one another, said foldable table being pivotable out of said hollow body means into operative position extending laterally of an adjacent seat, said foldable table being supported by a pivotal support structure, said support structure including a pivot link, said body means having an opening formed therein for receiving a portion of said pivot link, and said pivot link including a portion adapted to be disposed adjacent said opening for providing a closure for the opening and preventing the entrance of foreign matter through the opening.

2. Apparatus as defined in claim 1 including resilient means connected to said pivot link for normally pivoting the pivot link in a direction to move the foldable table out of said hollow body means.

3. An arm rest and concealed table unit comprising a hollow body means, said body means having a movable top providing access to the interior of the body means, a table assembly pivotally mounted within said body means, said table assembly including a support structure, a foldable table structure hingedly connected to said support structure, said support structure including a pivot link mounted for pivotal movement about an axis and connected to said foldable table structure, and resilient means normally urging said pivot link in one direction of rotation about said pivotal axis for moving said foldable table structure out of said body means, a portion of said body means having a slot formed therein, said pivot link including a portion which projects through said slot when the table assembly is in operative position, said pivot link also including a substantially arcuate portion pivotable into position adjacent said opening for providing a closure for the opening.

4. An arm rest and concealed table unit comprising a hollow body means, a pair of table assemblies pivotally mounted within said body means, means providing access to the interior of said body means whereby said table assemblies are pivotable into and out of said body means, each of said table assemblies including a pivot support structure and a foldable table structure, said foldable table structures each being hingedly connected to said pivot support structures, said pivot support structures including a pair of pivot links disposed adjacent one another and mounted for movement about a pivot axis, each of said pivot links being connected to one of said foldable table structures, and resilient means normally urging each of said pivot links in one direction of rotation about said pivot axis for moving the associated foldable table structures out of said body means, and said pivot support structures including a pivot bracket upon which said pair of pivot links are pivotally mounted, said pivot bracket including a longitudinally extending projection disposed intermediate said pair of pivot links, said means providing access to the interior of the body means comprising a movable closure member, said closuse member having means for engaging said projection formed on said pivot bracket for securing the closure member in closed position.

5. An arm rest and concealed table unit comprising a hollow body means including forward and rearward portions, a top pivotally connected adjacent the rearward portion of the body means for providing access to the interior of said body means, a base member secured to the forward portion of said body means, a pivot bracket supported by said base member, a pair of link members pivotally mounted on said pivot bracket for movement about a pivotal axis, said pivot bracket including a longitudinally extending projection having an arcuate upper surface, each of said link members including an upper portion defining an arcuate surface corresponding to the upper surface of said projection, said base member having a pair of slots formed therethrough, a pair of spring members each having one end thereof connected to one end of said links, a bracket member secured to the forward portion of said body means, the opposite ends of said spring members being connected to said bracket member, a pair of foldable table structures, each of said table structures including a first portion hingedly connected to the opposite end of one of said link members, each of said foldable table structures including a second portion hingedly connected to said first portion, a table support member slidably connected to each of said second portions, and said top closure member including means for engaging said longitudinally extending projection of said pivot bracket for maintaining the top closure member in closed position, said foldable table structures being pivotable out of said body means and into operative position such that they extend laterally away from one another in overlying relationship to adjacent seats.

6. A table assembly comprising a supporting base structure, an upstanding pivot bracket mounted on said base structure and defining a pair of yokes, a pair of pivot links each of which is pivotally supported by one of said yokes for pivotal movement about an axis, spring means connected to one end portion of each of said pivot links normally urging said pivot links in one direction of rotation about said pivot axes, a pair of hinges each including two interconnected members, each of said pivot links being connected to one member of a hinge, a pair of foldable table structures each of which includes first and second portions hingedly connected to one another, each of said first portions being connected to the other member of one of said hinges, whereby said foldable table structures are movable into folded position adjacent one another and are pivotable into operative position such that they extend laterally of the pivot support structure in opposite directions, said supporting base structure having a pair of slots formed therethrough, each of said spring means being connected to the associated pivot link by a connector member, each of said connector members extending through one of said slots, the upper portion of each of said pivot links having an arcuate surface for providing a closure means for openings disposed adjacent thereto.

7. Apparatus of the character described comprising a body structure of substantial length having front and rear ends and a substantial height and a narrow width compared to its height and length, the body structure having a table assembly chamber and a top access opening thereto, a closure member for said access opening, a table assembly including a leaf of a size to be stored in a vertical on-edge position in said chamber, and mechanism housed in the front end of said chamber on a stationary support therein and operatively connected with an edge portion of said leaf for facilitating swinging the vertically positioned leaf upwardly and forwardly out of the chamber through the access opening when the closure member is moved to opening uncovering position and said operative connection including a hinge means whereby said leaf may be swung from said vertical position to a horizontal position, said mechanism including a first link pivoted at one end to said stationary support to swing in the chamber to an upright position where its other end projects to the outside of the chamber and a second link pivotally coupled at one end to said other end of the first link and having its other end secured to the hinge means, the second link being adapted to extend forwardly from the upright first link to position the table leaf at the front of the body structure.

8. Apparatus of the character described comprising a body structure of substantial length having front and rear ends and a substantial height and a narrow width compared to its height and length, the body structure having a table assembly chamber and a top access opening thereto, a closure member for said access opening, a table assembly including a leaf of a size to be stored in a vertical on-edge position in said chamber, and mechanism housed in the front end of said chamber on a stationary support therein and operatively connected with an edge portion of said leaf for facilitating swinging the vertically positioned leaf upwardly and forwardly out of the chamber through the access opening when the closure member is moved to opening uncovering position and said operative connection including a hinge means whereby said leaf may be swung from said vertical position to a horizontal position, said hinge means comprising a member attached to one edge of the table leaf whereby the leaf may turn relative to the member on an axis parallel-ing the said one edge thereof and said mechanism includes a first link pivoted at one end to said stationary support to swing in the chamber to an upright position where its other end projects to the outside of the chamber and a second link pivotally coupled at one end to said other end of the first link and having its other end secured to the hinge means, the second link being adapted to extend forwardly from the upright first link to position the table leaf at the front of the body structure, and a bumper support carried by said hinge member in position to rest against the front of the body structure when said second link is in the said forwardly extended position.

References Cited in the file of this patent

UNITED STATES PATENTS

| | | |
|---|---|---|
| 364,460 | Abbott | June 7, 1887 |
| 1,753,423 | Kroschel | Apr. 8, 1930 |
| 1,801,886 | Steppan | Apr. 21, 1931 |
| 1,888,525 | Callaway et al. | Nov. 22, 1932 |
| 1,891,691 | Runkles | Dec. 20, 1932 |
| 1,914,721 | Isaif | June 20, 1933 |
| 1,949,405 | Bailey | Mar. 6, 1934 |
| 2,124,893 | Peppas | July 26, 1938 |
| 2,465,630 | Brown | Mar. 29, 1949 |
| 2,859,803 | McCallister | Nov. 11, 1958 |

FOREIGN PATENTS

| | | |
|---|---|---|
| 363,197 | Germany | Nov. 4, 1922 |
| 427,098 | Germany | Mar. 25, 1926 |
| 116,999 | Austria | Mar. 25, 1930 |
| 620,861 | Great Britain | Mar. 31, 1949 |